United States Patent [19]

Kaneko et al.

[11] Patent Number: 5,127,096
[45] Date of Patent: Jun. 30, 1992

[54] INFORMATION PROCESSOR OPERATIVE BOTH IN DIRECT MAPPING AND IN BANK MAPPING, AND THE METHOD OF SWITCHING THE MAPPING SCHEMES

[75] Inventors: Yutaka Kaneko, Oizumi; Tatsuyuki Ohama, Ora; Masami Tsukagoshi, Fukaya; Hideyuki Maehara; Masashi Yawata, both of Oizumi; Minoru Tada, Ota; Noriyuki Aoki, Oizumi; Chiaki Araki, Ota, all of Japan

[73] Assignee: Sanyo Electric Co., Ltd., Osaka, Japan

[21] Appl. No.: 334,498

[22] Filed: Apr. 7, 1989

[30] Foreign Application Priority Data

Apr. 20, 1988 [JP] Japan ............... 63-97305
Jun. 14, 1988 [JP] Japan ............... 63-146306

[51] Int. Cl.⁵ .............................. I20G 12/06
[52] U.S. Cl. ........................... 395/425; 364/DIG. 1
[58] Field of Search ... 364/200 MS File, 900 MS File

[56] References Cited

U.S. PATENT DOCUMENTS

| | | | |
|---|---|---|---|
| 4,300,192 | 11/1981 | Couleur et al. | 364/200 |
| 4,316,244 | 2/1982 | Grondalski | 364/200 |
| 4,340,932 | 7/1982 | Bakula et al. | 364/200 |
| 4,403,287 | 9/1983 | Blahut et al. | 364/200 |
| 4,485,457 | 11/1984 | Blaska et al. | |
| 4,761,733 | 8/1988 | McCrocklin et al. | 364/200 |

OTHER PUBLICATIONS

Patent Abstracts of Japan, vol. 7, No. 32 (P-174) [1177], Feb. 8, 1983.
Patent Abstracts of Japan, vol. 11, No. 337 (P-633) [66], Nov. 5, 1987.

Primary Examiner—Joseph A. Popek
Assistant Examiner—Reba I. Elmore
Attorney, Agent, or Firm—Armstrong, Nikaido, Marmelstein, Kubovcik & Murray

[57] ABSTRACT

An information processing apparatus includes a program memory (4, 40) and circuitry for switching mapping schemes so as to deal with both direct and bank mapping schemes without alteration of programs. The program memory (4) includes a first memory area (14, 15) formed of a plurality of memory blocks for storing a first program (100) for the bank mapping and a second memory area (16, 17) utilized as a memory block for storing a second program for direct mapping. In the bank mapping, each memory block is mapped into a same address area of an address space of the processor. In the direct mapping, the first and second memory areas are mapped in one-to-one correspondence into the address space. Alternative program memory (40) includes a first memory block (50) storing a first program and a second memory block (60) storing a second program. A predetermined identification information ("JA") is stored in a predetermined memory location of the second memory block. The execution of a program from one subroutine to another is performed using direct or bank mapping by determining whether the predetermined identification information is stored at an address in the address space which corresponds to the predetermined memory location.

22 Claims, 6 Drawing Sheets

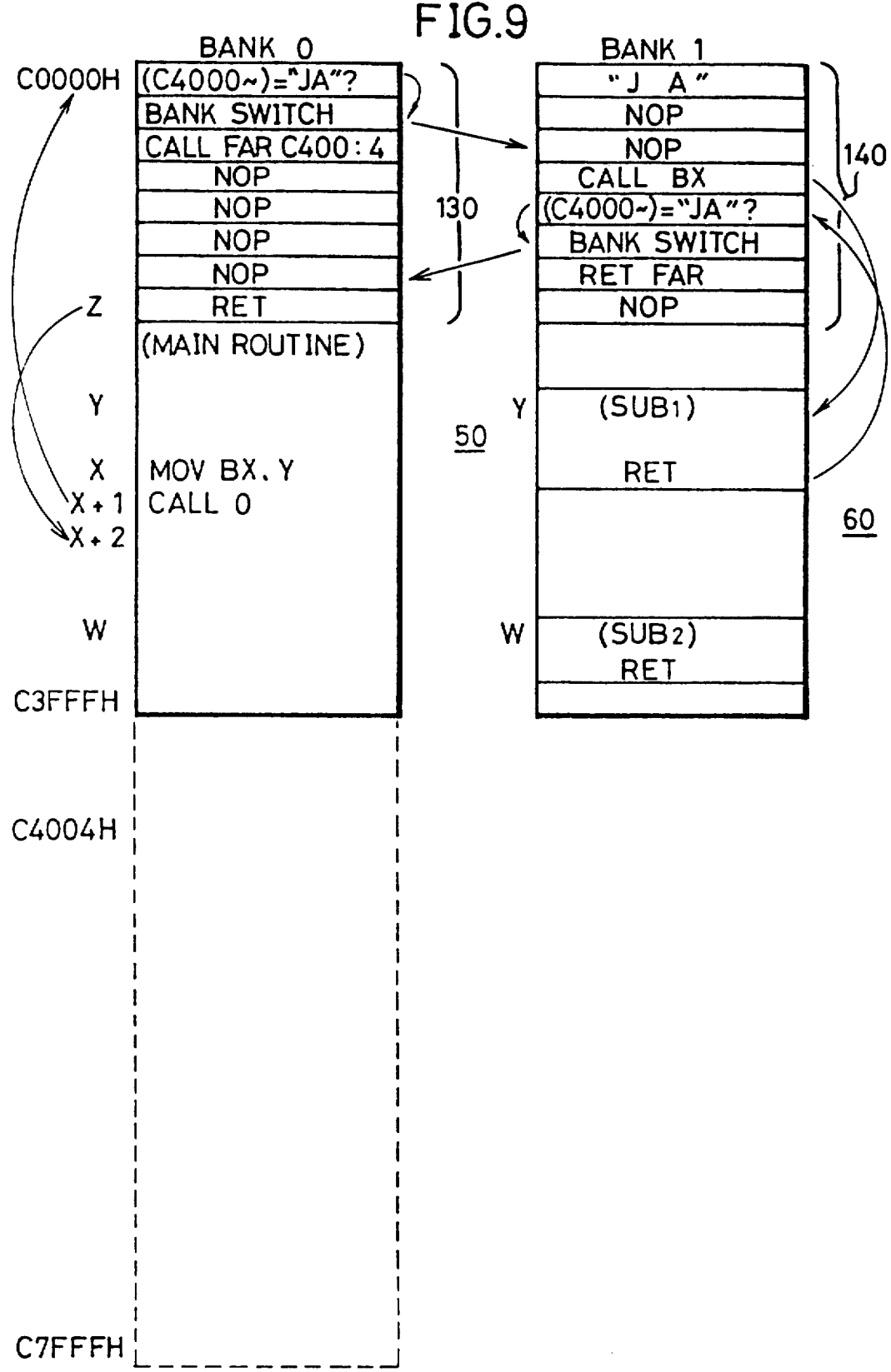

INFORMATION PROCESSOR OPERATIVE BOTH IN DIRECT MAPPING AND IN BANK MAPPING, AND THE METHOD OF SWITCHING THE MAPPING SCHEMES

BACKGROUND OF THE INVENTION

1. Field of the Invention

The present invention relates to an information processing apparatus such as a personal computer, and particularly for an information processing apparatus having a plurality of memory blocks each storing a processing program, for mapping the processing programs in the address space of a central processing unit (CPU) based on either a direct scheme or a bank scheme.

2. Detailed Description of the Background Art

Recently, information processors such as personal computers and word processors are used extensively. Such an information processing apparatus is provided with a ROM-based (ROM: read only memory) program memory for fixedly storing a system program which determines the fundamental operational function of the information processing apparatus. The program memory is generally mapped directly in the CPU address space.

However, for an information processing apparatus which is constrained in its standard memory capacity from the viewpoint of price/performance and the like, when it is intended to set as wide a user-accessible memory space (CPU address space) as possible, the address area assigned to the program memory is restricted, and a complete application program for providing a desired function cannot be stored therein. In such cases, a bank scheme as disclosed in, for example, Japanese Patent Unexamined publication No. 120543/1987 is adopted. In a bank scheme, a program memory is formed of multiple memory blocks, with each memory block being mapped into the same address area in the CPU's address space.

As one example, a case is considered in which the CPU's address space has an optional area for storing an application dependent content in proximity to the program area. In this case, if a user wants to load optional software (program), its program memory area is confined in a predetermined address area since the CPU's address space is fixed. Therefore, in order to store the entire program which exceeds the limited capacity of the program memory area, it must be mapped based on a bank scheme.

On the other hand, if no optional software program needs to be loaded, that area can be used as an extended program memory area, and in this case the program memory area can be acquired through the usual direct mapping scheme instead of the bank scheme.

However, in order for a program, which is conformable to the bank scheme, to process a routine across different memory banks, it needs to switch banks. Due to some differences between the bank scheme and the direct scheme, two types of programs must be prepared. Moreover, the bank scheme, which inevitably includes the bank switching step, is slower in processing speed than the direct scheme.

It is desirable for a processor to have the ability of selecting a mapping scheme depending on whether an application involves loading an optional software program. To this end, current hardware is capable of selecting either direct or bank mapping for the memory blocks of a program memory by using a jumper wire or hardware switch (or memory switch). Information processors with the above-mentioned hardware arrangement have a mapping scheme selected through selective connection by a jumper wire or switch, and have a program memory mounted selectively or replaced from among two kinds of program memories prepared in advance for direct and bank schemes. On this account, switching of mapping schemes necessitates a hardware modification using a jumper wire or switch, as well as replacement of the program memories for the alternation of software. Moreover, because both of these two mapping schemes cannot be accomplished by a single program memory, two types of programs would be required for the two mapping schemes. However, the provision of two kinds of program memories is unfavorable from the viewpoint of working efficiency and maintainability.

SUMMARY OF THE INVENTION

An object of this invention is to provide an improved information processing apparatus which readily deals with both the direct mapping scheme and the bank mapping scheme by merely switching the mapping schemes based on hardware.

A further object of this invention is to provide an information processing apparatus having a program memory based on a program transition scheme which is in turn conformable with both direct and bank mapping schemes using only one kind of program or without program alteration.

A further object of this invention is to provide a program mapping method which can deal with both direct and bank mapping schemes without program memory replacement.

The information processing apparatus of this invention comprises a program memory for storing a program which can deal with both a bank mapping scheme and a direct mapping scheme, and a device for selectively setting either the direct mapping scheme or the bank mapping scheme and mapping the memory address of the program memory in an address-space of a central processing unit (CPU) included in the information processing apparatus, in accordance with the selected mapping scheme.

According to a first aspect of this invention, the program memory includes a first memory block which stores a first program having the content of processing corresponding to the bank mapping scheme, and a second memory block which stores a second program having the content of processing corresponding to the direct mapping scheme. The second program is substantially the same in the processing content as the first program except for the exclusion of a program for bank switching.

According to a second aspect of this invention, the program memory includes a third memory block which stores a first processing program, and a fourth memory block which stores a predetermined identification information in a specific memory address and a second processing program. The information processing apparatus having the program memory according to the second aspect includes a device for, during execution of the first and second processing programs, making a decision as to whether the identification information is stored in the address to which the above-mentioned specific memory address corresponds when the fourth memory block is mapped in the direct mapping scheme in the CPU's address space and for implementing the switching of memory banks or the transition of an address to be executed in the CPU's address space.

When using a program memory according to the first aspect, the second program is executed when the direct mapping scheme is selected, while the first program is executed when the bank mapping scheme is selected.

When using a program memory according to the second aspect, the identification information is stored in the correspondent address in the CPU's address space when the direct mapping scheme is selected, while in the bank mapping scheme the identification information is not stored in the correspondent address therein. Accordingly, through the determination as to whether the identification information is present in the above-mentioned correspondent address, the transition scheme between the first processing program and the second processing program can be selected depending on the mapping scheme. Consequently, the mapping scheme can be switched without replacing the program memory.

These and other objects and features of this invention will become more apparent from the following detailed description taken in conjunction with the accompanying drawings.

BRIEF DESCRIPTION OF THE DRAWINGS

FIG. 9 shows specifically the layout of the memory blocks of the program memory in the CPU's address space when the program memory shown in FIG. 7 is mapped in bank mapping in the CPU's address space, as well as the operation flow.

DESCRIPTION OF THE PREFERRED EMBODIMENTS

Figure 1:
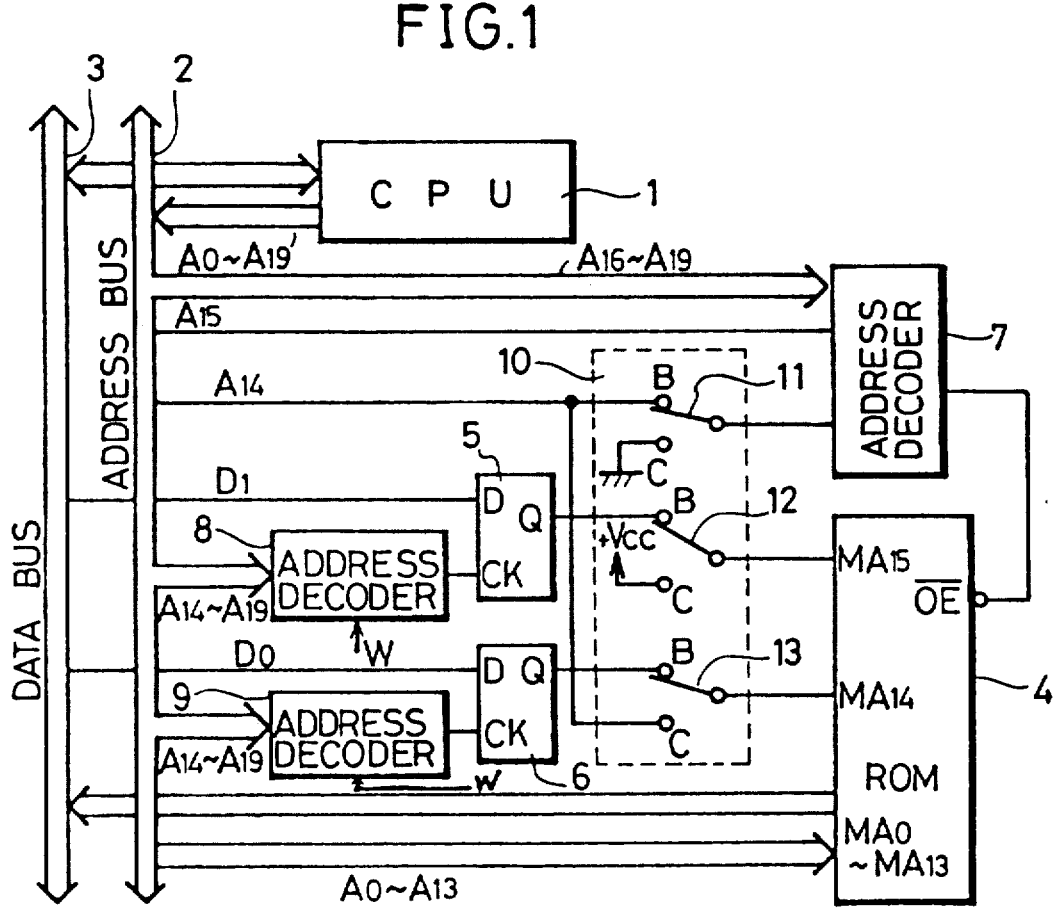
FIG. 1 shows schematically the arrangement of the information processing apparatus of an embodiment according to the invention.
Figure 2:
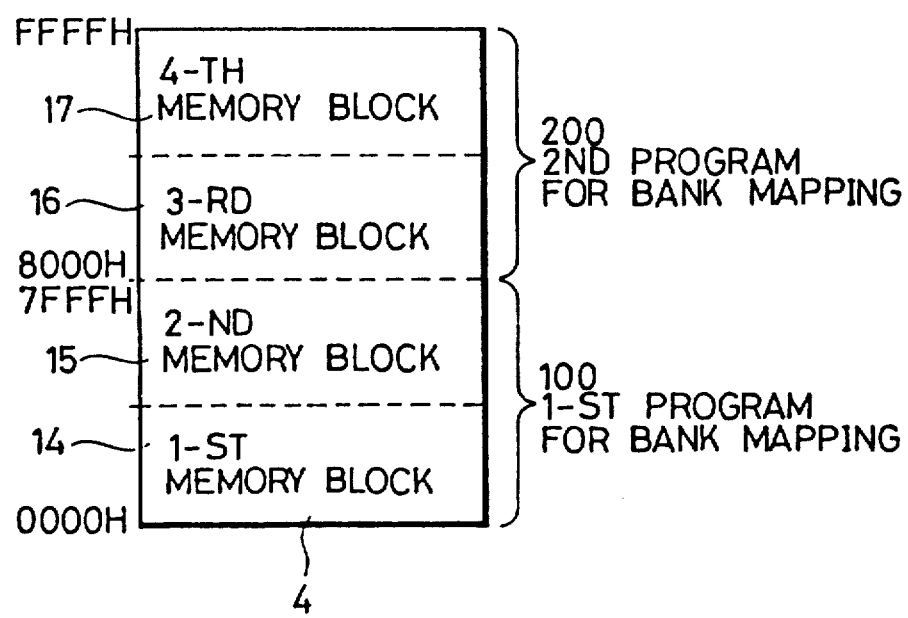
FIG. 2 shows an example of the arrangement of the program memory shown in FIG. 1.

FIG. 1 is a block diagram showing schematically the arrangement of the information processing apparatus which embodies the present invention. The inventive information processing apparatus includes a CPU 1 which is the core of the processor for implementing various computational and control operations, and a program memory 4 which is conformable to both direct and bank mappings The CPU 1 has an address space of 1M ($2^{20}$) bytes, for example, and provides the 20-bit address A0-A19 on an address bus 2. The program memory 4 is comprised of a ROM accessible by the 16-bit address MA0-MA15, i.e., having a capacity of 64K ($2^{16}$) bytes, and it stores, for example, the Basic I/0 System (BIOS) that is a control program for input/output units and disk drivers.

For switching of the memory area configuration of the program memory (which will be termed simply "ROM" hereinafter) 4 in correspondence to direct mapping scheme or bank mapping scheme, there are provided an address decoder 7 which controls enabling and disabling of the output of the ROM 4, bank registers 5 and 6 and associated address decoders 8 and 9 for designating banks of the ROM 4, and a switching circuit 10 which selectively sets the direct scheme or the bank scheme for mapping the memory area of the ROM 4 in the address space of the CPU 1.

The address decoders 8 and 9 receive the high-order 6 address bits A14-A19, for example, provided by the CPU 1 over the address bus 2, and produce an active signal of "1", if the received 6-bit address indicates a location within a predetermined address area and the CPU 1 issues a write signal W.

The bank registers 5 and 6 are each formed of a D-type flip-flop, for example, having a clock input CK, data input D and data output Q. The bank register 5 responds to the active output of the address decoder 8 to latch data D1 on the data bus 3 and to release it as output data through its output terminal Q. The bank register 6 responds to the active output of the address decoder 9 to latch data D0 on the data bus 3 and to release it as output data through its output terminal Q. The 2 data bits D0 and D1 designate one of four memory blocks (will be mentioned below) of the ROM 4.

The switching circuit 10 includes switches 11, 12 and 13 of hardware implementation for example. The switch 11 has an input terminal B receiving the address bit A14 on the address bus 2 and an input terminal C connected to the ground, and delivers its output to the address decoder 7. The switch 12 has an input terminal B receiving the Q output of the bank register 5 and an input terminal C connected to a predetermined supply voltage Vcc, and provides its output to the highest address bit MA15 input of the ROM 4. The switch 13 has an input terminal B receiving the output Q of the bank register 5 and an input terminal C receiving the address bit A14, and provides its output to the next highest address bit MA14 input of the ROM 4.

The address decoder 7 receives high-order address bits A15 to A17 from the CPU 1 through the address bus 2 and also receives the output of the switch 11.

The address decoder 7 produces a "0" signal when the high-order address bits A16-A19 from the CPU 1 is "C", in hexadecimal or "1100" in binary and the two address bits A14-A15 are both "0", enabling the ROM 4 to output. The reason for setting the address A16-A19 to the hexadecimal C is that the ROM 4 of the instant embodiment stores, for example, the BIOS mentioned previously and within the segment C000H of CPU 1 is assigned the BIOS area. Accordingly, if the ROM 4 is assigned to another segment of the CPU 1, the address decoder 7 will provide a different value of address bits A16-A19 for bringing the ROM 4 into the output enabled state.

The ROM 4 has an address space of 0000H-FFFFH (H: hexadecimal) and it is divided into four memory blocks 14, 15, 16 and 17 each having a 16K ($2^{14}$) byte capacity. The first memory block 14 occupies the address area 0000H-3FFFH of ROM 4, the second memory block 15 is assigned to the area 4000H-7FFFH, the third memory block 16 is to the area 8000H-BFFFH, and the fourth memory block 17 is to the area C000H-FFFFH. The first program 100 used in bank mapping is stored in the first and second memory blocks 14 and 15, and the second program used in direct mapping is stored in the third and fourth memory blocks 16 and 17. One memory bank is of 16K bytes in bank mapping.

Although the first program 100 and second program 200 are virtually the same in the content of processing, the first program 100 for the bank scheme differs from the second program for the direct scheme in the additional inclusion of a bank switching control program for the bank switching between the first memory block 14 and second memory block 15.

Figure 3:
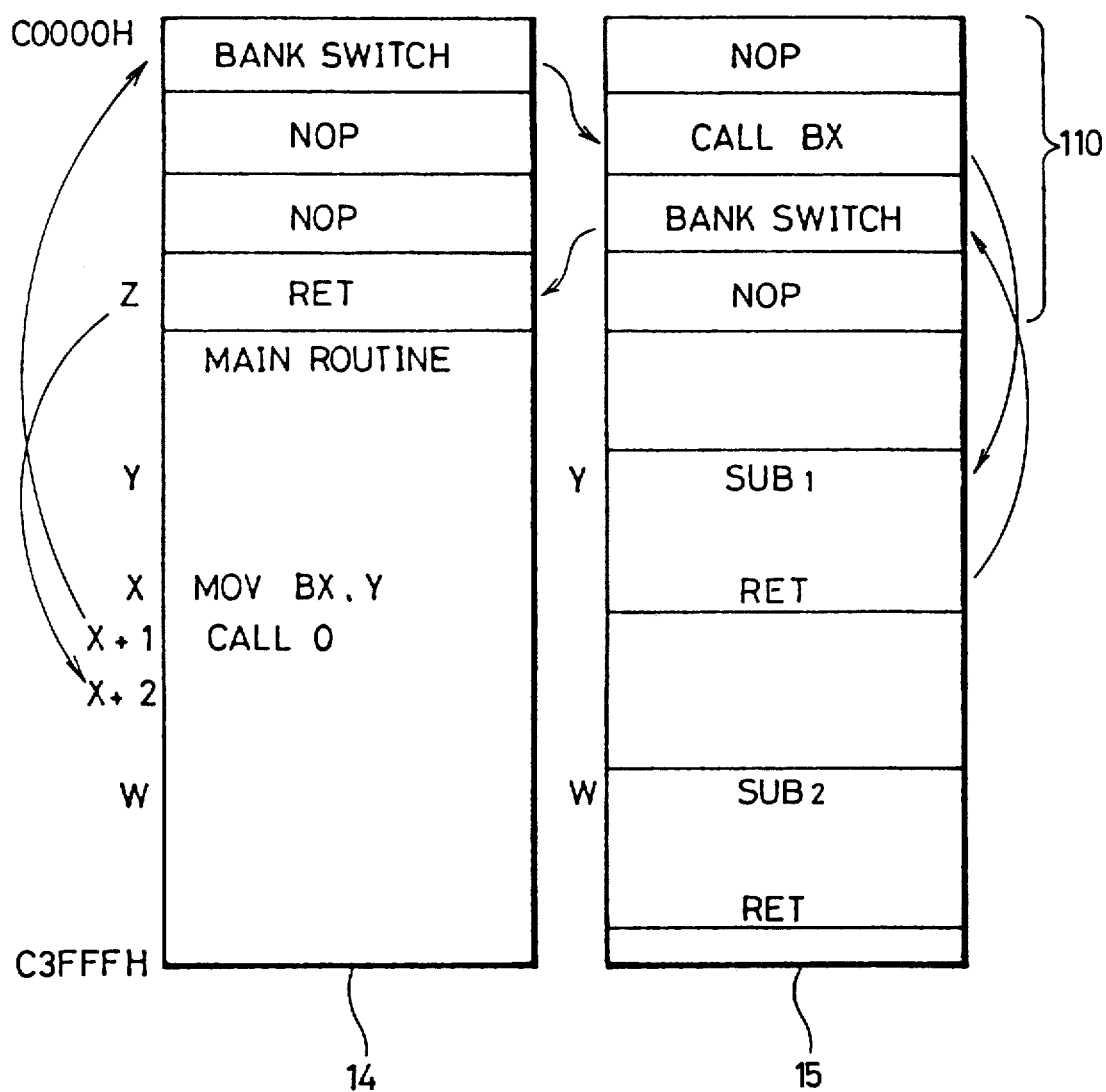
FIG. 3 shows an exemplary specific content of the first program shown in FIG. 2.

FIG. 3 shows an example of the first program 100, the specific content of which is disclosed in detail in the copending U.S. patent application Ser. No. 313677 filed by the same applicant. FIG. 3 shows the content of the program of the case in which a main routine stored in the first memory block 14 calls a subroutine stored in the 20 second memory block 15. Referring to FIG. 3 the memory bank switching control program is stored in the same address area 110 (hexadecimal 0000-Z of ROM 4 in FIG. 3) of the first and second memory blocks 14 and 15. In order for the main routine of the first memory block 14 to call a subroutine (SUB) stored in the second memory block 15, it is appended with instruction MOV BX, Y for transferring the starting address y of the subroutine SUB1 relative to the ROM 4 to a register BX (incorporated in the CPU 1), and instruction CALL 0 for invoking the bank switching control program in the first memory block 14. The bank switching control program in the memory block 14 includes the bank switching instruction, instruction NOP, and return instruction RET for returning to the main routine.

The second memory block 15 includes plural kinds of subroutines SUB1 and SUB2, and the bank switching control program. The bank switching control program in the second memory block 15 includes the instruction NOP, instruction CALL BX for invoking the content starting at the address stored in register BX (i.e., calling a subroutine), and the bank switching program. The operation of the first program will be explained in brief in the following, for the case as an example when the subroutine SUB1 in the second memory block 15 needs to be invoked during execution of the main routine stored in the first memory block 14.

At address X of the first memory block 14, starting address Y of the subroutine SUB1 is transferred to the register BX. At address X+1, the bank switching control program in the first memory block 14 is called by instruction CALL 0, and the memory bank is switched from the first memory block 14 to the second memory block 15 (bank switching operation will be explained later). Then, the subroutine SUB1 beginning at address Y is called by instruction CALL BX in the bank switching control program in the second memory block 15, and it is executed. Upon completion of the execution of subroutine SUB1, the RET instruction transfers control back to the bank switching control program in the second memory block 15 so that the bank is switched from the second memory block 15 to the first memory block 14. Subsequently, the RET instruction of the bank switching control program in the first memory block 14 brings the process back to the main routine.

In calling the subroutine SUB2, address W is transferred to the register BX at address X of the main routine. When a processing program resident in the second memory block 15 needs a subroutine in the first memory block 14, the address area 110 shown in FIG. 3 is extended so that the bank switching control program from the second memory block 15 to the first memory block 14 is stored in the extended area.

Next, the operation of the processor shown in FIG. 1 will be described. Initially, all input terminals of the switches 11-13 of the switching circuit 10 are set to each C-input position. Consequently, the ROM 4 has its address bit MA15 set to "1" by the switch 12, and its address bit MA14 receives the address bit A14 from the CPU1 through the switch 13.

Figure 4:
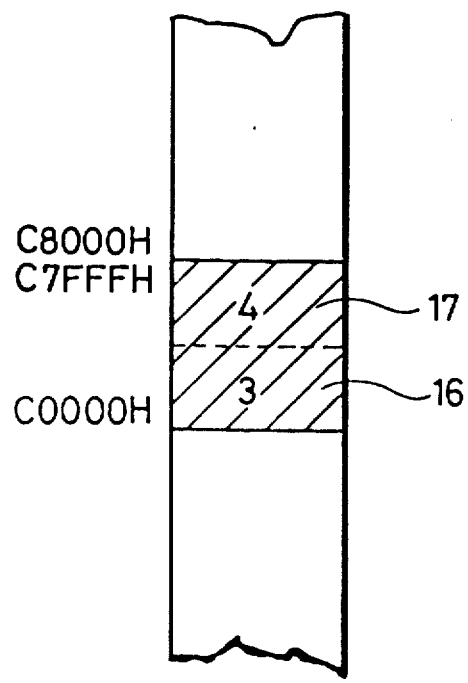
FIG. 4 shows the layout of memory blocks of the program memory in the CPU address space when the program memory shown in FIG. 2 has been mapped in a direct scheme in the CPU's address space.

The address decoder 7 receives address bits A16-A19 and A15 and the "0" bit from the switch 11. The address decoder 7 enables the ROM 4 to output only when the address bit A15 is "0" and the address bits A16-A19 are equal to hexadecimal C. Accordingly, the contents of ROM 4 are mapped in the address space C0000H-C7FFFH where the address bit A15 is "0" in the segment C of CPU 1. Since the ROM 4 has its most significant address bit MA15 fixed to "1", it has an accessible address area of 80000H-FFFFFH. Consequently, as shown in FIG. 4, the third and fourth memory blocks 16 and 17, i.e., the second program 200, are mapped directly to the address area of C0000H-C7FFFH of CPU 1.

Figure 5:
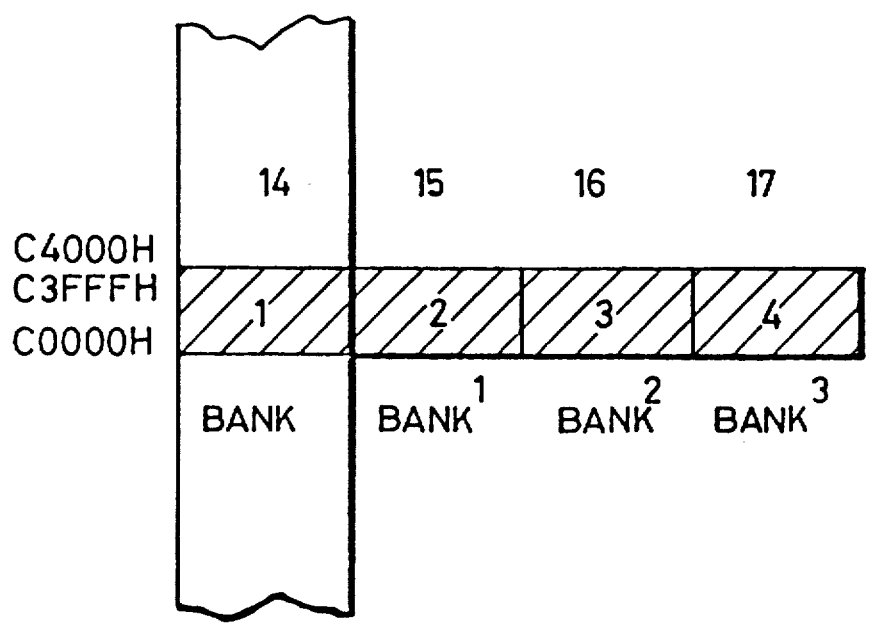
FIG. 5 shows the layout of the memory blocks of the program memory in the CPU address space when the program memory shown in FIG. 2 is mapped in the bank scheme in the CPU's address space.

With all input terminals of the switches 11-13 in the switching circuit 10 being set to the B-input position, the ROM 4 has its address bits MA15 and MA14 receive the outputs of the bank registers 5 and 6, respectively, and the address decoder 7 receives directly the address bits A14 and A15 from the CPU 1. Consequently, as shown in FIG. 5, the first through fourth memory blocks 14-17 of ROM 4 are mapped as memory banks 0-3 in the address area C0000H-C3FFFH, where the address bits A14 and A14 are both "0", in the address area C0000H-CFFFH of the CPU 1. The memory blocks of ROM 4 are selected by the most significant address bits MA14 and A15 provided by the bank registers 5 and 6, i.e., 2-bit data D0 and D1 from the CPU 1. With data (D1, D0) being (0, 0), the first memory block (bank 0) 14 is designated, with (0, 1), the second memory block (bank 1) 15 is designated, with (1, 0), the third memory block (bank 2) 16 is designated, and with (1, 1), the fourth memory block (bank 3) is designated.

In bank mapping, the bank switching is carried out by the CPU 1 which sets the bank designation data D0 and D1 to the bank registers 5 and 6 in accordance with the bank switching control program included in the first program 100. More specifically, the bank switching takes place as follows. In the bank designation, the CPU 1 places the bank designation data D0 and D1 on the data bus 3, and thereafter issues a set of predetermined values of address bits A14-A19 (e.g., 110000) to the address decoders 8 and 9 and further issues the write signal W thereto. The address decoders 8 and 9 respond to the address bits A14-A19 and the write signal W to provide an active signal to the clock input CK of the bank registers 5 and 6. In response to the active signal from the address decoders 8 and 9, the bank registers 5 and 6 latch the data on the data bus 3. In this case, the values of address which causes the address decoders 8 and 9 to produce active signals should be set so that the decoders 8 and 9 respond only when a memory bank within address range C0000H-C3FFFH is accessed, thereby avoiding possible unnecessary rewriting of the bank registers 5 and 6.

In the foregoing embodiments, the bank registers 5 and 6 are both initialized to have Q output "1" when power is turned on, and therefore the fourth memory block (bank 3) 17 is selected as the memory bank initially. Consequently, the bank switch command to the first memory block 14 is stored in address C000H (relative to ROM 4) of the fourth memory block 17. By this bank switching command, the bank is switched to the first memory block (memory bank 0) 14 under control of the CPU 1, followed by the execution of the initialization routine and then the prescribed process by the first program which has been mapped as bank 0 and bank 1. It should be noted that address C000H of the fourth memory block (memory bank 3) 17 is unnecessary at the execution of the second processing program 200, and on this account the second program 200 is designed so that the address C000H is not used at the execution of the second program 200.

In the foregoing embodiment, a single ROM is used as the program memory 4, in which the first and second programs are stored. However, the first and second programs may be stored in separate ROMs, and furthermore each memory block may be arranged in each individual ROM.

Figure 6:
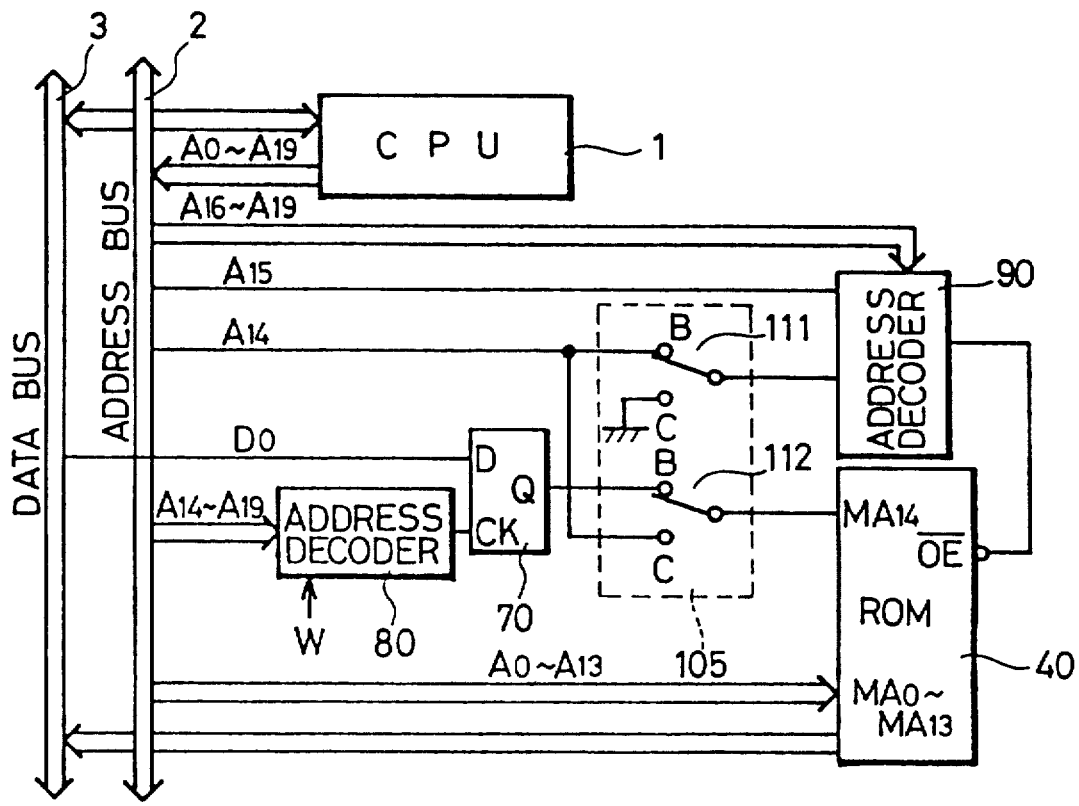
FIG. 6 shows schematically the arrangement of the information processing apparatus of another embodiment according to this invention.

Although in the foregoing embodiment two kinds of programs i.e., the first and second programs are prepared and only one of them is used depending on the mapping scheme, an alternative way is to deal with both direct mapping and bank mapping using only one kind of program, as shown schematically in FIG. 6 as another embodiment of this invention.

Referring to FIG. 6, the information processing apparatus according to another embodiment includes a CPU 1, a program memory 40, a bank register 70, address decoders 80 and 90, and a switching circuit 105. The CPU 1 has an address space of 1 M bytes ($2^{20}$ bytes) ranging 00000H-FFFFFH, for example, and provides 20-bit address A0-A19 on the address bus 2.

Figure 7:
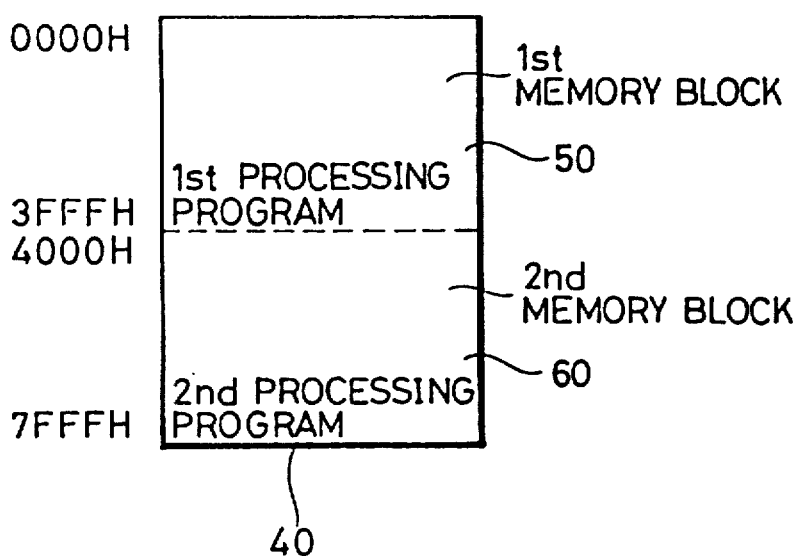
FIG. 7 shows schematically the arrangement of the program memory shown in FIG. 6.

The program memory 40 is arranged in a 32K($2^{15}$) byte ROM, including a first memory block 50 of 16K bytes ranging 0000H-3FFFH and a second memory block 60 of 16K bytes ranging 4000H-7FFFH, as shown schematically in FIG. 7. The first memory block 50 stores the first processing program, and the second memory block 60 stores the second processing program. The first and second processing programs in unison form a control program such as BIOS.

The address decoder 80 serves to decode the high-order 6 address bits A14-A19, for example, on the address bus 2, and only when the given address is within a predetermined area, it provides an active signal to the clock input CK of the bank register 70 in response to the write signal W. The bank register 70 responds to the active input at its clock input C to latch the bank designation data D0 on the data bus 3 and to release the latched data as output Q.

The switching circuit 10 selects either the direct scheme or the bank scheme as a scheme for mapping the contents of program memory 40 in the address space of CPU 1. The switching circuit 105 includes switches 111 and 112. The switch 111 has an input terminal B receiving an address bit A14 from the CPU 1 and an input terminal C connected to ground, while the switch 112 has an input terminal B receiving the Q output from the bank register 70 and an input terminal C receiving the address bit A14 from the CPU 1.

The address decoder 90 receives 5 address bits A15-A19 from the CPU 1 and the output of the switch 111, and delivers its output to the output enable terminal $\overline{OE}$ of the program memory 40. The address decoder 90 produces an active enable signal ("0" level in FIG. 6) only when the address A16-A19 from the CPU 1 is hexadecimal C, for example, and at the same time the address bit A15 and the output of switch 111 are both "0". The program memory 40 has its address designated by the output of the switch 112 and the address A0-A13 from the CPU 1. The output of the switch 112 is given to the most significant address bit MA14 of the program memory 40.

Although the foregoing arrangement resembles the one shown in FIG. 1, only one program is stored in the program memory 40, and the arrangement is simpler than that of FIG. 1. The operation of designating the mapping scheme is virtually the same as that of FIG. 1, and therefore only a brief explanation will be given in the foregoing.

The bank mapping scheme is selected by setting the input terminals of the switches 111 and 112 to the respective B input position. In this case, as shown in FIG. 9, the contents of the program memory 40 are mapped as a memory bank in the address area in which the address A16-A19 is hexadecimal C and address bits A14 and A15 are both "0", i.e., in the area C0000H-C3FFFH Of CPU address space. When the most significant address bit MA14 of the program memory 40 is "0", the first memory block 50 in the address area 0000H-3FFFH of the program memory 40 is selected as bank 0, and when the most significant address bit MA14 is "1", the second memory block 60 in the address area 4000H-7FFFH of the program memory 40 is selected as bank 1.

Figure 8:
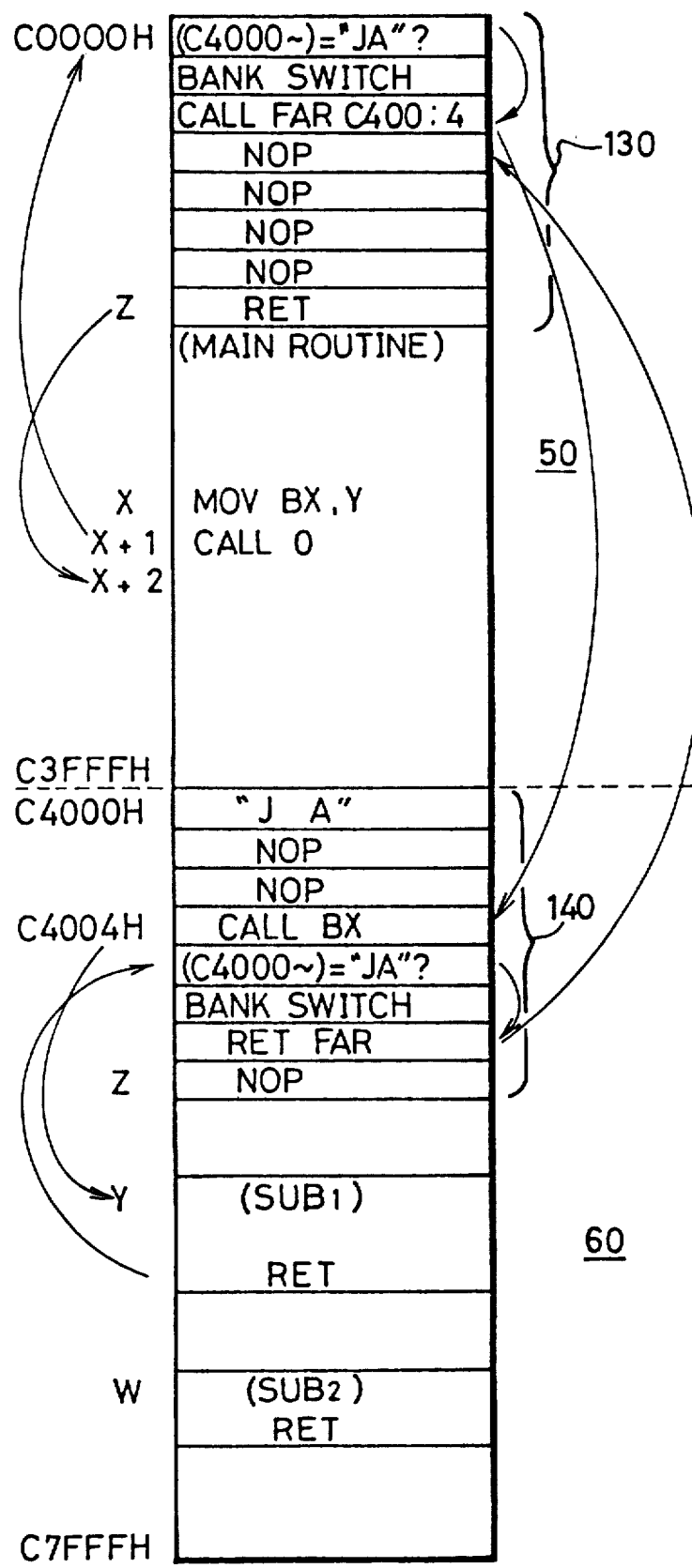
FIG. 8 shows schematically the layout of the memory blocks of the program memory in the CPU's address space when the program memory shown in FIG. 7 is mapped in the direct scheme in the CPU's address space, and also shows the content of the program stored in each memory block and the operation flow.

With the input terminals of the switches 111 and 112 being set to the respective C input positions, the direct mapping scheme is selected. In this case, the whole contents of program memory 40, i.e., the first and second memory blocks 50 and 60, are mapped directly in the address area C0000H-C7FFFH of CPU 1, as shown in FIG. 8. At this time, the address bit A14 of CPU 1 is supplied to the most significant address bit MA14 of the program memory 40 through the switch 112, and the first memory block 50 is mapped in the address area C0000H-3FFFFH of CPU 1, and the second memory block 60 is mapped in the address area C4000H-C7FFFH of CPU 1.

The first and second processing programs stored in the first memory block 50 and second memory block 60, respectively, are designed to have the contents as shown specifically for example in FIG. 8 and 9, so that both the direct scheme and bank scheme can be compatibly used. Shown in FIGS. 8 and 9 are examples in which the main routine of the first processing program invokes the subroutines of the second processing program.

Referring to FIGS. 8 and 9, the first and second memory blocks 50 and 60 store the first and second control programs 130 and 140 in the respective starting addresses 0000H and 4000H through a relative address Z. Mapping scheme identification information "JA" is stored in the specific address (4000H in FIGS. 8 and 9) of the second memory block 60.

The first control program 130 includes the bank switching instruction, instruction "(C4000⁻)="JA"", instruction "CALL FAR C400 4", instruction RET, and instruction NOP. The "(C4000⁻)="JA"" instruction is to determine the identification information "JA" is stored in address C4000H of CPU 1. The CPU's address C4000H corresponds to address 4000H of the program memory 4 in the direct mapping scheme, and it corresponds to an address in a memory block other than the first and second memory blocks 50 and 60 in the bank mapping scheme. Accordingly, by executing the "(C4000⁻)="JA"" instruction, the mapping scheme can be identified. The "CALL FAR C400 : 4", instruction is to call and execute the contents beginning at the address C4004H which is the starting address C4000H added by the offset address 4.

The second control program 140 includes instruction "CALL BX", instruction "(C4000⁻)="JA"", bank switching instruction, instruction "RET FAR", and instruction NOP. in addition to the identification information "JA". The "RET FAR" instruction is to shift the execution address (address to be executed) to the address next to the address where the "CALL FAR" instruction is stored. In other words, the instructions "CALL FAR C400 : 4" and "RET FAR" are to merely shift the execution address in the address space of CPU 1 in the direct mapping scheme.

The following describes in detail with reference to FIGS. 8 and 9 the operation in the case in which the main routine in the first processing program calls a subroutine in the second processing program to execute it. In FIGS. 8 and 9, the addresses X, Y, Z and W represent offset addresses from the starting address C0000H or C4000H of each segment (each memory block). Arrows in the figures indicates the progression of operation. The first and second control programs are stored with their addresses being correspondent mutually so that the address counter does not need to be revised unnecessary at each instruction execution.

The operation in direct mapping scheme will first be explained with reference to FIG. 8. In this case, as mentioned previously, the first memory block 50 is mapped in CPU's address space C0000H-C3FFFH, and the second memory block 60 is mapped in C4000H-C7FFFH thereof. Accordingly, the identification information "JA" is stored in the specific address C4000H of the CPU's address space.

When execution of the first processing program progresses to reach the address X at which the subroutine SUB1 is to be called and executed, the starting address Y of the subroutine SUB1 is transferred to the register BX (incorporated in CPU 1). At the next address X+1, the first control program 130 is executed by the instruction "CALL 0". The command at the top address C0000H of the first control program 130 decides whether or not the identification information "JA" is stored in address C4000H of CPU 1. The decision result is "yes" in this direct mapping scheme. Accordingly, the bank switching instruction stored in the next address is skipped. The instruction "CALL FAR C400 : 4" at the skipped destination address causes the execution program to make transition from the first processing program to the second processing program, and then the instruction "CALL BX" at address 15 C4004H is executed as shown by the arrow in FIG. 8. The register BX is already supplied with the starting address Y of the subroutine SUB1 by the main routine of the first processing program. Then, the subroutine SUB1 is invoked by the CALL instruction and it is executed. On completion of execution of the subroutine SUB1, the RET instruction in the subroutine SUB1 causes the execution address to move to the decision step of identification information in the second processing program. Since the decision result is also "yes" in this scheme, the RET FAR instruction is executed, and the program sequence returns to the first control program 130. Namely, the execution program makes a transition from the second processing program to the first processing program. Subsequently, through the execution of the RET instruction in the first control program 130, the sequence returns to the main routine of the first processing program. It should be noted that if it is intended to call and execute the subroutine SUB2 from the main routine, the subroutine starting address W is stored in the register BX.

Next, the operation in the bank mapping scheme will be explained with reference to FIG. 9. In this case, the switches 111 and 112 have their input terminals set to the B input position. Consequently, the first and second memory blocks 50 and 60 are mapped as bank 0 and bank 1 in the address area C0000H-C3FFFH in the address space of CPU 1. Accordingly, the identification information "JA" is not stored in the specific address C4000H of CPU 1. Therefore, when the main routine of the first processing program has invoked the first control program 130, the decision step for identification information results in "no", and the bank switching instruction is executed. The bank switching instruction sets the bank register 70 to store "1" under control of CPU 1, and the memory bank is switched from bank 0 to bank 1, followed by the transition from the first processing program to the second processing program.

After the transition of programs, the CALL BX instruction in the second control program 140 of the second processing program calls and executes the subroutine SUB1 beginning at the address Y stored in the register BX. After the subroutine SUB1 has been executed, the RET instruction in the subroutine SUB1 brings the program sequence back to the second control program 140. Return to the second control program 140 is immediately followed by the decision on identification information. The decision result is "no" in this case, and the bank switching instruction stored in the next address is executed. The bank switching takes place in the manner of setting in the bank register 70 "0" under control of CPU 1. As a result of the bank switching, the transition from the second processing program to the first processing program is carried out, and then the first control program 130 is executed. The RET instruction in the first control program 130 brings the program sequence back to the main routine of the first processing program, and the execution of main routine is resumed at address X+2.

As described above, both the bank mapping scheme and the direct mapping scheme can be dealt with a single kind of program. The switching of mapping schemes is readily accomplished by switching the input terminals of the switches 111 and 112 in the switching circuit 105.

If the second processing program requires a subroutine in the first processing program, the second and first control programs are added to the first and second control programs as shown in FIGS. 8 and 9, respectively.

It is also possible to provide two respective address decoders for bank and direct mapping schemes in place of the switch 111 in the switching circuit 105 and the address decoder 90 of the foregoing embodiment, wherein the outputs of the address decoders are delivered through a switch to the output enable terminal of the program memory 40.

Any decoder configuration may be employed as far as the following requirement is satisfied. Among the two address decoders one is designed to produce an active enable signal when the address A16-A19 is hexadecimal C and at the same time the address bit A15 is "0" (address bit A14 may be anything), and the other is to produce an active enable signal when the address A16-A19 is hexadecimal C and at the same time address bits A14 and A15 both are "0".

It is not always necessary for the first and second processing program to be stored in a single ROM, instead, each processing program may be stored in two or more ROMs. In the case of using two ROM chips, replacing the most significant address bits MA14 of ROM 40 in FIG. 6 with the chip enable signal $\overline{CE}$ allows each memory block to be readily mapped in either the bank mapping scheme or the direct mapping scheme. The structure may be also employed in which the output of the switch 11 and the output of the address decoder 90 in FIG. 6 is subjected to such a logical operation as OR or NOR corresponding to each memory block and then applied to the output enable terminal of the ROM. Also in the case of using three or more ROM chips, each ROM has its number of address bits decreased as the number of ROMs increases, and, by logically processing the remaining address bits from the CPU 1 appropriately, the ROM memory blocks can readily be mapped in the address space of CPU 1 according to each mapping scheme.

The foregoing arrangement enables only one type of program to deal with both direct and bank mapping schemes, which not only eliminates the need of replacing the program memory itself depending on the mapping scheme, but also allows the use of a ROM of less capacity for the program memory. Moreover, it becomes unnecessary to prepare two programs of virtually the same content, and a significant improvement is achieved for the product cost, working efficiency and serviceability.

According to the present invention, as described above, a program which is designed to deal with both the bank and direct mapping schemes is stored in the program memory, and therefore the information processing apparatus can deal with either of the direct mapping scheme and the bank mapping scheme by merely switching the mapping scheme on a hardware basis, instead of replacing the program memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus including a central processing unit, said central processing unit having a predetermined address space, said information processing apparatus comprising:

storage means having a first memory block formed of a plurality of memory areas for storing a first program and a second memory block formed of at least one memory area for storing a second program, said first program having a same processing sequence as said second program except that said first program includes a control program for switching between said plurality of memory areas;

designating means, connected to said storage means, for alternately designating one of two mapping schemes which maps the memory areas of said storage means into said predetermined address space, said two mapping schemes being direct mapping and bank mapping; and map switching means, connected to said designating means, for switching said mapping schemes of said storage means into said predetermined address space according to a designated mapping scheme which is designated by said designating means;

said map switching means for mapping each of said plurality of memory area, in said first memory block as a memory bank, into a same address area of said predetermined address space when said bank mapping scheme is designated, so that said first program is to be executed, and mapping said second memory block in one-to-one correspondence into said predetermined address space when said direct mapping scheme is designated so that the second program is to be executed.

2. An apparatus according to claim 1, wherein said storage means comprises a single read only memory.

3. An apparatus according to claim 1, wherein
said map switching means comprises definition means (5, 6, 8, 9, 12, 13) for defining an accessible memory area of said storage means in accordance with the designated mapping scheme designated by said designation means, and address area setting means for identifying an address area in said predetermined address space in which the accessible memory area, defined by said definition means, is mapped.

4. An apparatus according to claim 3, wherein said address area setting means includes output control means for activating said storage means into an output enabled state in accordance with a predetermined number of high-order address bits from an address from said central processing unit and the designated mapping scheme designated by said designation means, said output control means enabling output of said storage means only when the address from said central processing unit represents an address in the address area of said predetermined address space assigned to said storage means depending on the designated mapping scheme from said bank and direct mapping schemes.

5. An apparatus according to claim 4, wherein said output control means includes first selecting means for selecting one of a) a predetermined binary value and b) a predetermined address bit from said high order address bits, according to the designated mapping scheme designated by said designating means, and decoder means for decoding a) remaining address bits from said high-order address bits and b) output of said first selecting means and for controlling the output enable state of said storage means depending on the decoded result.

6. An apparatus according to claim 3, wherein said definition means includes register means for storing data designating one memory bank among said plurality of memory banks, and definition control means for setting an accessible memory area in said storage means in accordance with bank designating data stored in said register means and the designated mapping scheme designated by said designating means, said definition control means for setting the accessible memory area of said storage means such that only a memory bank designated by said bank designating data can be accessed when said bank mapping scheme is designated, and for setting the accessible address area of said storage means such that said central processing unit can access a whole of said second memory block storing said second program when the direct mapping scheme is designated.

7. An apparatus according to claim 6, wherein said register means includes a plurality of data latches and further said definition control means includes second selecting means for selecting and for supplying one of a) latched data in a predetermined data latch from said plurality of data latches and b) a predetermined binary value according to the designated mapping scheme to an address input of said storage means, and third selecting means for selecting one of a) latched data in the remaining data latch and b) a predetermined address bit out of address bits supplied from said central processing unit depending on the designated mapping scheme and for supplying a selected one to the address input of said storage means.

8. An information processing apparatus including a central processing unit, said central processing unit having a predetermined address space, said information processing apparatus comprising:

storage means including a first memory area for storing a first processing program and a second memory area for storing a second processing program, said second memory area storing predetermined identification information in a predetermined memory location;

designating means, connected to said storage means, for alternatively designating one of two mapping schemes for mapping said memory areas of said storage means into said predetermined address space, said two mapping schemes being a direct mapping scheme and a bank mapping scheme;

map switching means, connected to said designating means, for switching mapping schemes for said storage means according to a designated mapping scheme designated by said designating means, said map switching means mapping said first and second memory areas each as a memory bank on a same address area into said predetermined address space when the bank mapping scheme is designated, and mapping said first and second memory areas in on-to-one correspondence into said predetermined address space when said direct mapping scheme is designated;

determining means, connected to said map switching means, for determining, during execution of said first and second processing programs, whether said identification information is stored at an address in said predetermined address space corresponding to said predetermined memory location when said second memory area is mapped into said predetermined address space in said direct mapping scheme; and control means, connected to said switching means, for switching memory banks from one memory bank storing a processing program to the other memory bank when a result of said determining means indicates an absence of said identification information, and for shifting an address to be executed in said predetermined address space when the result of said determining means indicates presence of said identification information.

9. An apparatus according to claim 8, wherein said storage means is comprised of a single read only memory.

10. An apparatus according to claim 8, wherein said map switching means comprises:

memory area defining means for defining an accessible address area of said storage means depending on the designated mapping scheme; and address area setting means for identifying an address area in said predetermined address space where the accessible memory area defined by said memory area defining means is mapped, depending on the designated mapping scheme.

11. An apparatus according to claim 10, wherein said address area setting means includes output control means for enabling output of said storage means based on high-order address bits from an address delivered from said central processing unit and the designated mapping scheme, said output control means activating said storage means into an output enabled state only when the address from said central processing unit represents a location in the accessible address area of said predetermined address space assigned to said storage means corresponding to each mapping scheme among the direct and bank mapping schemes.

12. An apparatus according to claim 11, wherein said output control means includes:

first selecting means for selecting and supplying one of a) a predetermined binary value and b) a predetermined address bit from said high-order address bits depending on the designated mapping scheme designated by said designating means, and decoder means for decoding received remaining address bits of said high-order address bits and output of said first selecting means and for controlling enabling of the output of said storage means in response to the decoded result.

13. An apparatus according to claim 10, wherein said memory area defining means includes:

register means for storing data which designates a memory bank, definition control means for identifying said accessible memory area of said storage means in accordance with bank designating data stored in said register means and the designated mapping scheme designated by said designating means, said definition control means for defining the accessible memory area of said storage means so that only the memory bank designated by said bank designating data can be accessed when said bank mapping scheme is designated, and for defining the accessible memory area of said storage means so that said central processing unit can access a whole of said first and second memory areas for storing said first and second process programs when the direct mapping scheme is designated, and further wherein, said control means includes means for writing said bank designating data into said register means in response to an absence of said identification information determined by said determining means.

14. An apparatus according to claim 13, wherein said register means includes a data latch, and said definition control means includes second setting means for selectively supplying to an address input of said storage means one of a) latched data in said data latch and b) a predetermined address bit from the address from said central processing unit depending on the designated mapping scheme.

15. An information processing apparatus including a central processing unit, said central processing unit having a predetermined address space, said information processing apparatus comprising:
storage means including a first memory block for storing a first processing program and a second memory block for storing a second processing program, said second memory block storing predetermined identification information at a predetermined memory location;
designating means, connected to said storage means, for designating one of direct mapping and bank mapping schemes as a scheme for mapping memory blocks of said storage means into the predetermined address space; and
map switching means, connected to said designating means, for switching mapping schemes for the memory blocks of said storage means depending on a designated mapping scheme designated by said designating means, wherein said map switching means maps, on a same address area into said predetermined address space, each of said first and second memory blocks as a memory bank when the bank mapping scheme is designating, while said map switching means maps said first and second memory blocks in one-to-one correspondence in said predetermined address space when the direct mapping scheme is designated;
each of said first and second progressing programs including a control program for determining whether said predetermined identification information is stored in the address, which corresponds to said predetermined memory location, when said first and second memory blocks are mapped into said predetermined address space based on the direct mapping scheme, and for implementing memory bank switching in response to an absence of said predetermined identification information and for shifting an address to be executed into said predetermined address space in response to a presence of said predetermined identification information.

16. A method of mapping a program into an information processing apparatus including a central processing unit which has a predetermined address space, said method comprising the steps of:
providing a memory in said information processing apparatus having a plurality of memory area;
storing a first program in a first memory area, said first program includes a processing program for implementing bank switching;
storing a second program in a different memory area of said memory than said first program, said second program being substantially identical in content to said first program except that said second program does not include said processing program for implementing said bank switching;
selecting either a direct mapping scheme or a bank mapping scheme for mapping said memory areas in the predetermined address space of said central processing unit, wherein, in said direct mapping scheme, every area of said memory for storing said second program is mapped in one-to-one correspondence into said predetermined address space of said central processing unit, and, in said bank mapping scheme, areas of said memory for storing said first program are mapped as memory banks in a same address area of said predetermined address space of said central processing unit; and
mapping only one of the first and second programs in accordance with the mapping scheme selected.

17. A program mapping method according to claim 16, wherein said program mapping step comprises the steps of:
designating one of said memory banks, when said bank mapping scheme is set, said designating memory bank storing at least a part of said first program, and
accessing said designated memory bank to execute said first program,
said memory bank designating step including a step of executing said processing program for implementing bank switching included in said first program.

18. A program execution method according to claim 16, wherein said program mapping step comprises a step of mapping said second program, following access to at least one memory area in which said second program is stored when said direct mapping scheme is set.

19. A program mapping method according to claim 16, wherein said mapping scheme selecting stop comprises:
a first step of establishing an address area of said memory accessible by said central processing unit; and
a second step of establishing an address area in which one memory area is mapped in the predetermined address space of said central processing unit;
said second step including a step of activating memory into an output enabled state when said central processing unit accesses the address area assigned to said memory in said predetermined address space, and otherwise disabling an output of said memory.

20. A method mapping a program into an information processing apparatus including a central processing unit which has a predetermined address space, said method comprising the steps of:
providing a memory in said information processing apparatus, said memory having a plurality of memory areas for storing a plurality of processing programs, each said memory areas storing a processing program different from each other, with a predetermined identification information being stored in a predetermined memory location of at least one predetermined memory area among said memory areas;
selecting either a bank mapping scheme or a direct mapping scheme for mapping said memory areas in said predetermined address space of said central processing unit, wherein, in said direct mapping scheme, said plurality of memory areas are mapped in one-to-one correspondence into said predetermined address space, and, in said bank mapping scheme, said plurality of memory areas are each as a memory bank mapped in a same address area of said predetermined memory space;
determining, during processing one of said plurality of processing programs, whether or not said predetermined identification information is stored in the address corresponding to said predetermined memory location in said predetermined at least one address area when said predetermined at least one address area is mapped in said predetermined address space in accordance with the processing program being processed; and switching memory banks from the memory bank storing said processing program to a specific bank among the remaining banks when a result of said determination indicates an absence of said predetermined identification information, and, shifting the address to be accessed in said predetermined address space when said result of said determination indicates a presence of said predetermined identification information.

21. A program mapping method according to claim 20, wherein each of said memory areas forming said memory banks stores a processing program for implementing bank switching, and wherein said mapping scheme selecting step comprises a first step of establishing a memory area of said memory accessible by said central processing unit, and a second step of establishing an address area in which each said memory area is mapped in said predetermined address space of said central processing unit, said second step comprising a step of activating said memory into an output enabled state, when said central processing unit accesses an address area in which said memory areas have been mapped, and otherwise disabling an output of said memory.

22. A program mapping method according to claim 20, wherein said memory areas comprise two individual memory areas each providing one memory bank.

* * * * *